United States Patent

Utsui et al.

[11] Patent Number: 4,716,650
[45] Date of Patent: Jan. 5, 1988

[54] METHOD OF ASSEMBLING MAGNETIC RECORDING DISK CARTRIDGE

[75] Inventors: Masaaki Utsui; Makoto Shimizu; Noriyuki Hoshina; Nobuyuki Adachi; Takashi Kurihara; Tatsuo Shiino, all of Kanagawa, Japan

[73] Assignee: Fuji Photo Film Co., Ltd., Kanagawa, Japan

[21] Appl. No.: 34,240

[22] Filed: Apr. 6, 1987

[30] Foreign Application Priority Data

Apr. 4, 1986 [JP] Japan ................... 61-77595

[51] Int. Cl.⁴ .................. B21D 39/03; B23P 11/00
[52] U.S. Cl. .................. 29/430; 29/33 K; 29/700; 29/822
[58] Field of Search ......... 29/33 K, 428, 429, 430, 29/526 R, 791, 793, 700, 822, 823, 824

[56] References Cited

U.S. PATENT DOCUMENTS

| | | | |
|---|---|---|---|
| 3,457,627 | 7/1969 | Napor et al. | 29/430 |
| 3,742,586 | 7/1973 | Butler et al. | 29/430 |
| 4,100,667 | 7/1978 | Napor et al. | 29/430 X |
| 4,127,925 | 12/1978 | Gaiser et al. | 29/430 |
| 4,228,579 | 10/1980 | Dunkel et al. | 29/430 |
| 4,330,925 | 5/1982 | Kato et al. | 29/430 X |

Primary Examiner—Howard N. Goldberg
Assistant Examiner—Ronald S. Wallace
Attorney, Agent, or Firm—Sughrue, Mion, Zinn, Macpeak & Seas

[57] ABSTRACT

A magnetic recording disk cartridge comprises a magnetic disk unit rotatably accommodated in a casing. A method of assembling the magnetic recording disk cartridge comprises a first conveying step of conveying a lower half of the casing by a first conveyor, a second conveying step of conveying an upper half of the casing by a second conveyor, a disk assembling step of receiving a magnetic disk sheet and a core part and securing the magnetic disk sheet to the core part to form a magnetic disk unit, a disk unit placing step of placing the magnetic disk unit on the lower half of the casing on the first conveyor, and a casing assembling step of transferring both the upper half of the casing on the second conveyor and the lower half of the casing with the magnetic disk unit on the first conveyor to an assembly table, receiving mechanical parts, incorporating the mechanical parts in the lower half on the assembly table, subsequently connecting the upper and lower halves and transferring the integrated casing to a third conveyor. The disk unit placing step is carried out by the intermittent-stop-and-wait system.

1 Claim, 3 Drawing Figures

METHOD OF ASSEMBLING MAGNETIC RECORDING DISK CARTRIDGE

BACKGROUND OF THE INVENTION

1. Field of the Invention

This invention relates to a method of assembling a magnetic recording disk cartridge comprising a casing and a magnetic recording disk accommodated therein for rotation.

2. Description of the Prior Art

There has come into wide use as a recording medium for computers a floppy disk which is a flexible disk of polyester resin or the like bearing a magnetic layer on each side thereof and on which information is recorded by a magnetic head while the recording disk is rotated at a high speed.

Recently, there has been proposed a so-called electronic camera in which, instead of a conventional silver halide photographic film which cannot be reexposed after developing, a magnetic recording disk which is smaller than the floppy disk both in thickness and diameter and is generally referred to as "video floppy disc" is used as a recording medium. Generally the video floppy disc for the electronic camera is accommodated in a hard casing to form a jacket.

Conventionally, assembly of the magnetic recording disk cartridges including the floppy disk jacket and the video floppy disc jacket has not been fully automated.

SUMMARY OF THE INVENTION

In view of the foregoing observations and description, the object of the present invention is to provide a method of assembling a magnetic recording disk which enables the magnetic recording disk cartridge to be assembled by a fully automated system.

The method in accordance with the present invention comprises a first conveying step of conveying a lower half of the casing by a first conveyor, a second conveying step of conveying an upper half of the casing by a second conveyor, a disk assembling step of receiving a magnetic disk sheet and a core part and securing the magnetic disk sheet to the core part to form a magnetic disk unit, a disk unit placing step of placing the magnetic disk unit on the lower half of the casing on the first conveyor, and a casing assembling step of transferring both the upper half of the casing on the second conveyor and the lower half of the casing with the magnetic disk unit on the first conveyor to an assembly table, receiving mechanical parts, incorporating the mechanical parts in the lower half on the assembly table, subsequently connecting the upper and lower halves and transferring the integrated casing to a third conveyor, and is characterized in that said disk unit placing step is carried out by the intermittent-stop-and-wait system.

Though a direct connection system and a synchronization system may be used in addition to the intermittent-stop-and-wait system as the system for connecting two kinds of assembling steps, the former system is disadvantageous in that if one of the two kinds of assembling steps is interrupted, the other assembling step must be interrupted, complicated devices are required and it is difficult to ensure high accuracy, while the latter system is disadvantageous in that if one of the assembling steps is interrupted, the other assembling step must be interrupted, and that a synchronizing system is additionally needed, which adds to the initial cost. On the other hand, the intermittent-stop-and-wait system is advantageous over the other two systems in that if one of the two steps is interrupted, the other step can be continued, and simple and inexpensive systems can be used, and maintenance is easy, whereby the time efficiency is improved.

DESCRIPTION OF THE PREFERRED EMBODIMENT

Figure 1:
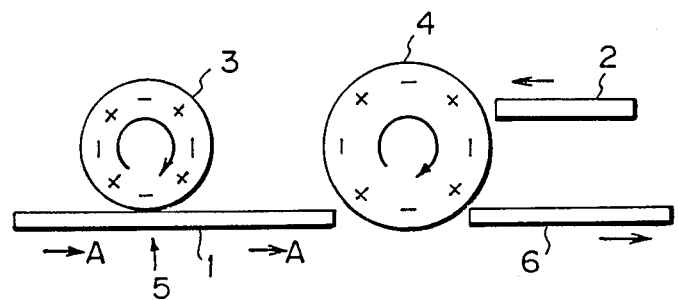
FIG. 1 is a schematic plan view showing an example of a magnetic recording disk cartridge assembling system for carrying out the method of the present invention.

In FIG. 1, a magnetic recording disk cartridge assembling system comprises a first conveyor 1 for conveying a lower half of a casing and a second conveyor 2 for conveying an upper half of the casing, and a disk unit assembling section 3, a casing assembling section 4 and a mounting section 5 for placing the disk unit assembled at the disk unit assembling section 3 on the lower half of the casing conveyed by the first conveyor 1 are disposed near the first conveyor 1.

The first and second conveyors 1 and 2 are known free flow conveyors and extend in parallel to each other.

Figure 2:
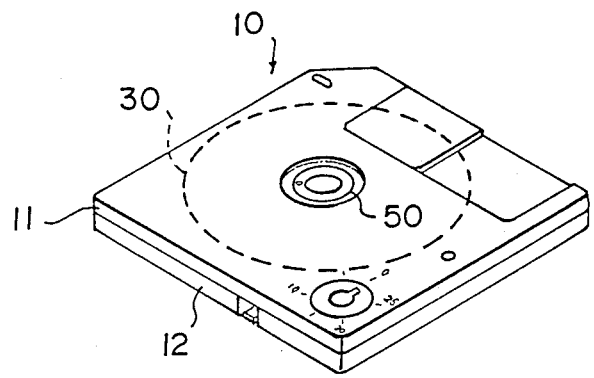
FIG. 2 is a perspective view showing an example of the magnetic recording disk cartridge to be assembled by the method of the present invention.
Figure 3:
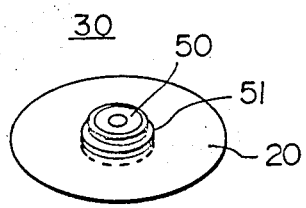
FIG. 3 is a perspective showing an example of a magnetic disk unit.

FIG. 2 shows the magnetic recording disk cartridge to be assembled by the system shown in FIG. 1. The casing 10 for rotatably accommodating the magnetic disk sheet comprises an upper half 11 and a lower half 12 connected together as shown in FIG. 2 and is well known. In the casing 10 is accommodated a magnetic disk unit 30 comprising a magnetic disk sheet 20 and a core block 50 and an upper core 51 fixed to the magnetic disk sheet 20. The lower half 12 is placed on the upstream end (the left side end in FIG. 1) of the first conveyor 1.

The lower half 12 is conveyed by the first conveyor 1 in the direction of arrow A and is stopped at the mounting section 5. The disk unit 30 is assembled by the disk unit assembling section 3 which comprises an index table, for example, and is incorporated in the lower half 12 stopped at the mounting section 5. (A method of assembling the magnetic disk unit is disclosed in our Japanese Unexamined Patent Publication No. 60(1985)-202578, for example.) The lower half 12 provided with the disk unit 30 is conveyed to the casing assembling section 4 by the first conveyor 1. The casing assembling section 4 receives the lower half 12 with the disk unit 30 and incorporates various parts (e.g., the mechanical parts) in the lower casing, and then connects the upper half 11 supplied from the second conveyor 2 to the lower half 12. The magnetic recording disk cartridge thus assembled is conveyed to the next step by a free flow conveyor 6.

Though in the system described above, as the conveying means for conveying the upper and lower halves 11 and 12, the first and second conveyors 1 and 2 separate from each other are used, a single free flow conveyor on which the upper and lower halves 11 and 12 are alternately placed may be used. However, the former system is preferred in that when the upper lower halves 11 and 12 are conveyed by separate conveyors, transfer of the halves 11 and 12 to the conveying means and take-up of the same from the conveying means are facilitated.

What is claimed is:

1. A method of assembling a magnetic recording disk cartridge having a magnetic disk unit rotatably accommodated in a casing, comprising a first conveying step of conveying a lower half of the casing by a first conveyor, a second conveying step of conveying an upper half of the casing by a second conveyor, a disk assembling step of receiving a magnetic disk sheet and a core part and securing the magnetic disk sheet to the core part to form a magnetic disk unit, a disk unit placing step of placing the magnetic disk unit on the lower half of the casing on the first conveyor, and a casing assembling step of transferring both the upper half of the casing on the second conveyor and the lower half of the casing with the magnetic disk unit on the first conveyor to an assembly table, receiving mechanical parts, incorporating the mechanical parts in the lower half on the assembly table, subsequently connecting the upper and lower halves and transferring the integrated casing to a third conveyor, said disk unit placing step being carried out by the intermittent-stop-and-wait system.

* * * * *